210-163
7/15/86 03 RE 32,248

United States Patent [19]

Blecher

[11] E Patent Number: Re. 32,248

[45] Reissued Date of Patent: Sep. 16, 1986

[54] GRATE FOR DRAINAGE DUCTS

[75] Inventor: Peter Blecher, Hagen, Fed. Rep. of Germany

[73] Assignee: TWB-Pressteile GmbH, Hagen, Fed. Rep. of Germany

[21] Appl. No.: 573,306

[22] Filed: Jan. 23, 1984

Related U.S. Patent Documents

Reissue of:

[64] Patent No.: 4,367,142
Issued: Jan. 4, 1983
Appl. No.: 360,889
Filed: Mar. 22, 1982

[51] Int. Cl. ..... E03F 5/14

[52] U.S. Cl. ..... 210/163; 52/180; 52/303; 404/2

[58] Field of Search ..... 210/163-166; 404/2; 52/303, 180

[56] References Cited

U.S. PATENT DOCUMENTS 797,985 8/1905 Kees ..... 210/164 X
1,396,442 11/1921 Lachman ..... 210/164
2,305,955 12/1942 Dudley ..... 210/164
4,188,814 2/1980 Dodge et al. ..... 72/324

FOREIGN PATENT DOCUMENTS 2232846 1/1974 Fed. Rep. of Germany ..... 52/180

*Primary Examiner*—John Adee
*Attorney, Agent, or Firm*—Harness, Dickey & Pierce

[57] ABSTRACT

A ladder-like grate for use in drainage ducts, which grate includes a main surface portion and opposed, upright longitudinal edges extending along respective longitudinal sides of the main surface portion, is produced from two sheet metal components at least one of which is provided with slits and each of which is provided with supporting bars. One component is an inner component which includes longitudinal bars extending along opposite sides thereof. The other component is an outer component which includes angled longitudinal edge parts extending along opposite sides thereof. The components are assembled together with the inner component within the outer component, the longitudinal bars held in the longitudinal edge parts, and the supporting bars of the inner component resting against those of the outer component.

11 Claims, 3 Drawing Figures

GRATE FOR DRAINAGE DUCTS

Matter enclosed in heavy brackets [ ] appears in the original patent but forms no part of this reissue specification; matter printed in italics indicates the additions made by reissue.

BACKGROUND OF THE INVENTION

The present invention relates to a ladder-type grate of sheet steel for drainage ducts, which grate is of the type that is provided with upright longitudinal edges which are angled with respect to oppositely disposed longitudinal edges and supporting bars disposed between the longitudinal edges, each supporting bar being separated from an adjacent supporting bar by an intake slit having an edge which is crimped in the upright direction of the longitudinal edges and merges, parallel to each supporting bar, into an oblique intake surface.

Drainage ducts are intended to drain traffic surfaces. They receive the incoming precipitation water in lines and conduct it away. Drainage ducts are formed by the lining up of duct elements, i.e. elongate drainage structures having a trough-shaped cross section and covered by grates or covers. Drainage ducts are classified according to the location at which they are installed.

For testing purposes, forces are exerted on the duct elements and on the grates and covers, such forces being of different magnitudes depending on location and classification of the drainage ducts. Grates for traffic surfaces traveled exclusively by pedestrians and bicycles, whose classification in class A, are subjected to a test force of 15 kN; grates for footpaths, pedestrian areas, automobile parking lots and automobile parking decks, classified as class B, to a test force of 125 kN; grates for curbstones in streets and pedestrian paths, median and side strips, and parking lots, which are classified as class C, are subjected to a test force of 250 kN.

Grates of the above-mentioned type easily withstand the low force test; withstand the medium force tests only under certain conditions; and they do not withstand the high force test at all. The reason for this is that in the transition region from the intake slit into the longitudinal edge only the sheet metal without any reinforcement must support the bearing, or test, force.

For use under medium and heavy loads, grates made of cast iron are therefore employed. However, compared to grates of the above-mentioned type, cast iron grates are heavy and expensive. Moreover, they are brittle so that there exists the danger of breakage during handling, including transport, installation, removal and disassembly for cleaning, as well as under asymmetrical loads.

SUMMARY OF THE INVENTION

It is therefore an object of the present invention to provide a novel grate for drainage ducts which is made of sheet metal and is constructed in such a manner that it is able to withstand even high loads.

The above and other objects are achieved, according to the invention, in a ladder-like grate made of sheet steel for use in drainage ducts, which grate includes a main surface portion and opposed, upright longitudinal edges extending along respective longitudinal sides of the main surface portion, each edge including a part which is angled toward the other longitudinal edge, the grate further including supporting bars extending between the longitudinal edges and formed to define inlet slits each extending between the longitudinal edges and each located between two adjacent supporting bars, and the grate further being formed to present, around each slit, a folded-down edge establishing an inlet surface oriented obliquely to the main surface portion, by constituting the grate of sheet steel inner and outer components one of which is provided with the slits and each of which is provided with the supporting bars, providing the inner component with longitudinal bars extending along opposite sides thereof, providing the outer component with angled longitudinal edge parts extending along opposite sides thereof, and disposing the inner component within the outer component with the longitudinal bars held in the longitudinal edge parts, and the supporting bars of the inner component resting against those of the outer component.

The objects according to the invention are further achieved by producing the above-defined grate according to the following sequence steps:

- providing two sheet metal pieces to constitute respective ones of the grate components;
- pressing recesses and stop humps into the outer grate component piece, and forming the lateral bars and supporting bars in the inner grate component piece, in such a manner that the supporting bars of the inner grate component have side walls extending transversely to the main surface portion;
- forming the inlet surfaces of the slits, partly forming the longitudinal edge parts of the outer component so that the partly formed parts extend transversely to the main surfce portion, and forming the longitudinal bars of the inner component to extend transversely to the main surface portion; and
- inserting the inner component into the outer component; and
- finally forming the longitudinal edge parts by bending the extremity of each edge part toward the other edge part for engaging the inner component longitudinal bars.

Among the advantages realized by the invention are that the grate is able to withstand not only all loads but particularly those corresponding to Classes B and C, and also remains light-weight and unbreakable. The grate according to the invention is additionally stabilized in the transverse direction by the supporting bars, and in the longitudinal direction by the lateral bars, of the inner grate.

The invention provides that an exterior grate of a certain sheet metal thickness is associated with interior grates of a different sheet metal thickness to thus adapt the load carrying capacity to the prevailing stresses. The limit to possible variations lies only in the width of the back of the supporting bar for the inner grate which is placed into the supporting bar of the outer grate.

The lateral bars of the inner grate, on the one hand, which are held between the angled longitudinal edges of the outer grate, and the supporting bars of the inner grate held between the oblique intake surfaces of the supporting bars of the outer grate, on the other hand, form a stable connection which requires no additional fastening means. Rather the inner grate is held immovably in the outer grate.

The inner grate does not interfere with drainage since the inlet slits of the outer grate remain completely exposed. Cleaning of such a grate is also not impaired. The outer and inner grates may be made, in a known manner, of Sendzimir zinc-galvanized steel sheet, of steel sheet, hot galvanized after molding or of stainless steel sheet. It is advantageous to press stop humps into the surface of the outer grate as protection against sliding. —Sendzimir zinc-galvanising denotes a hot dip zinc coating without flux.

DESCRIPTION OF THE PREFERRED EMBODIMENTS

Figure 1:
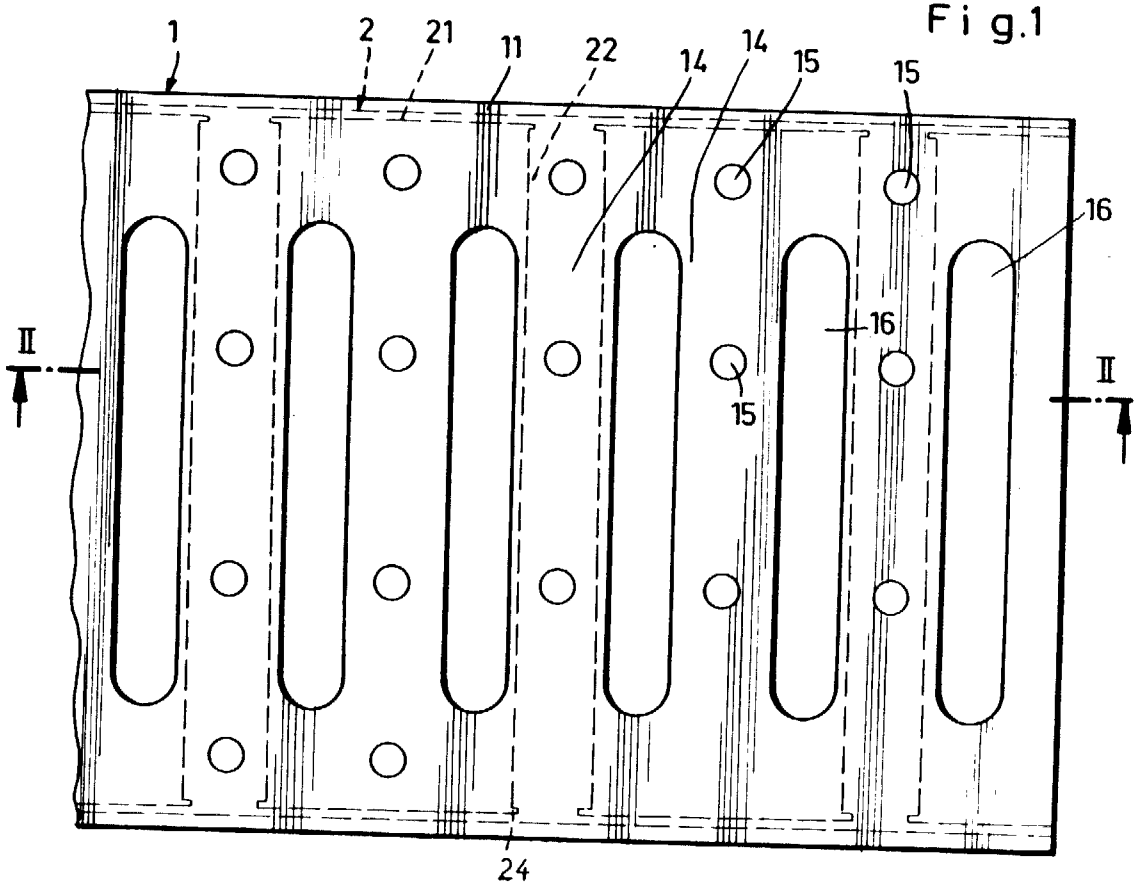
FIG. 1 shows, approximately to scale, a top plan view of a preferred embodiment of a grate according to the invention, of which only the part following one frontal face is shown.

The illustrated grate for drainage ducts includes an outer grate component 1 and an inner grate component disposed within the outer component 1. Each of the components 1 and 2 has the shape of a ladder and is made of a respective steel sheet.

The outer grate component 1 has two longitudinal edges 11 each of which consists of an upright edge portion 12 and a portion 13 which is angled with respect to portion 12 and extends toward the opposite longitudinal edge. Supporting bars 14 extend between the longitudinal edges 11. Edges 11 and bars 14 constitute integral parts of a one-piece member. An inlet slit 16 is disposed between each adjacent pair of supporting bars 14. Each inlet slit 16 has an edge 18 which is bent out of the plane of the major face of component 1 to extend parallel to edge portions 12. Between the major face of component 1, which corresponds to the major faces of bars 14, and each edge 18, there is a transition portion presenting an inlet face 17 which is oblique to the major face of component 1.

The inner grate component 2 is formed of two longitudinal bars 21 and shaped supporting bars 22 integral with, and extending between, the bars 21. The inner grate component 2 is held via its longitudinal bars 21 between the angled longitudinal edges 11 of the outer grate component 1. The supporting bars 22 of the inner grate component 2 rest against the supporting bars 14 of the outer grate component.

Each bar 21 of the inner grate component 2 is formed of an upright edge strip of the associated steel sheet. Each supporting bar 22 is formed as an inverted trough whose cross-sectional profile has essentially the form of an inverted U. The bases 23 of the supporting bars 22 of the inner grate component 2 rest against the lower, or inside, surfaces of the supporting bars 14 of the outer grate component 1. The end faces 24 of the side walls 25 of the supporting bars 22 abut against the bars 21. At each end face, the base 23 of each supporting bar 22 merges into a longitudinal bar 21.

Since the supporting bars 22 of the inner grate component 2 are made of the same sheet steel piece as the longitudinal bars 21, it is possible, if the spacing of the inlet slits 16 of the outer grate 1 is given, for the supporting bars 22 of the inner grate component 2 to be spaced apart so that, as in the illustrated embodiment, a bar 22 rests only against every other supporting bar 14 of the outer grate component 1. If the inlet slits 16 of the outer grate component 1 are arranged at a greater distance from one another or if the faces 12 are made shorter, it is possible, while adhering to the principle that the outer grate component 1 and the inner grate 2 are each to be made of a respective steel sheet, to provide the component 2 with supporting bars 22 arranged so that one bar 22 rests against each supporting bar 14 of the outer grate component 1. The load carrying capability of the grate can also be increased by using a stronger steel sheet for the inner grate component to give the longitudinal bars 21 and the supporting bars 22 thicker side walls and thus an increase in stability.

The inner grate component 2 is held in the outer grate component 1, on the one hand, by its longitudinal bars 21 between the angled longitudinal edges 11 and, on the other hand, by its supporting bars 22 in contact with the supporting bars 14 located between angled inlet faces 17. The inner grate component 2 is thus held immovably in the outer grate component 1 and no additional fastening means are required.

The grate is manufactured most easily in the following manner:

In a first process step, indentations to form faces 17 and edges 18 and the stop humps 15 are pressed into a steel sheet intended for the outer grate component 1. Simultaneously, but separately therefrom, the contours of the longitudinal bars 21 and of the supporting bars 22 are cut in a steel sheet intended for the inner grate component 2.

In the second process step, the indentations in the steel sheet intended for the outer grate component 1 are cut open and the end sections are cut off. Separately therefrom, the side walls 25 of the supporting bars 22 of the inner grate component 2 are simultaneously bent upright.

In the third process step, the inlet faces 17 at the supporting bars 14 and the longitudinal edges 11 of the outer grate 1 are bent upright. Separately therefrom the longitudinal bars 21 of the inner grate component 2 are bent upright. Then the inner grate component 2 is inserted into the outer grate 1 so that the supporting bars 22 are nested in the supporting bars 14.

Then the extremities of the longitudinal edges 11 of the outer grate component 1 are bent to form portions 13 which are pressed around the bars 21 of the inner grate component 2. The above-mentioned process steps can be performed on the same press in a machine that operates in steps.

Figure 3:
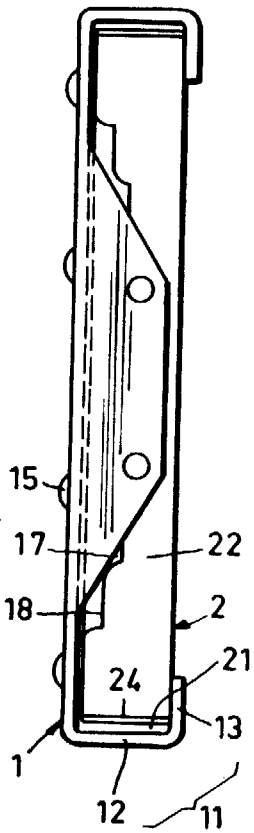
FIG. 3 is an end elevational view of the grate shown in FIGS. 1 and 2.
Figure 2:
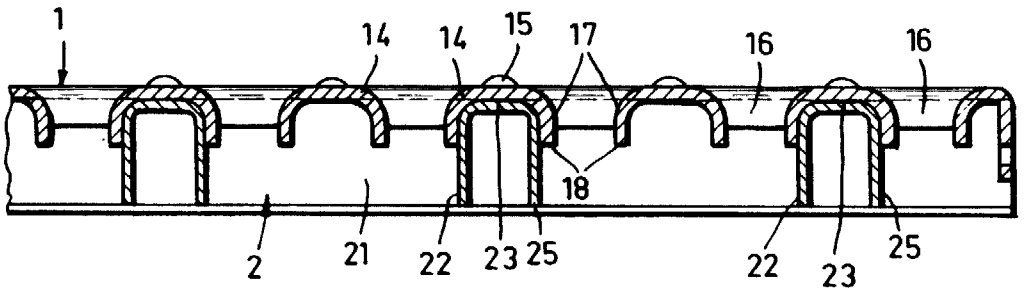
FIG. 2 is a longitudinal cross-sectional view through part of the grate along the section line II—II of FIG. 1.

As can be seen in FIGS. 2 and 3, each end of the grate is provided with a tab extending at right angles to the major surface of the grate and the edges 11. Each tab is provided with bores for fastening adjacent grates together.

It will be understood that the above description of the present invention is susceptible to various modifications, changes and adaptations, and the same are intended to be comprehended within the meaning and range of equivalents of the appended claims.

What is claimed is:

1. In a ladder-like grate made of sheet steel for use in drainage ducts, which grate includes a main surface portion and opposed, upright longitudinal edges extending along respective longitudinal sides of the main surface portion, each edge including a part which is angled toward the other longitudinal edge, the grate further including supporting bars extending between the longitudinal edges and formed to define inlet slits each extending between the longitudinal edges and each located between two adjacent supporting bars, the grate further being formed to present, around each slit, a folded-down edge establishing an inlet surface oriented obliquely to the main surface portion, the improvement wherein said grate comprises sheet steel inner and outer components one of which is provided with said slits and each of which is provided with said supporting bars, and wherein said inner component includes longitudinal bars extending along opposite sides thereof, said outer component includes angled longitudinal edge parts extending along opposite sides thereof, and said components are assembled together with said inner component within said outer component, said longitudinal bars held in said longitudinal edge parts, and said supporting bars of said inner component resting against those of said outer component.

2. Grate as defined in claim 1 wherein said longitudinal bars of said inner grate component are formed of sheet metal portions extending transversely to said main surface portion.

3. Grate as defined in claim 2 wherein said supporting bars of said inner grate component have the form of inverted troughs having bases which bear against respective supporting bars of said outer grate component and having side walls presenting axial end faces which abut against said longitudinal bars of said inner component.

4. Grate as defined in claim 1, 2 or 3 wherein said outer grate component is of a defined sheet metal thickness, and said inner grate component has a sheet metal thickness selected from a plurality of thickness values.

5. A method of producing the grate defined in claim 1, 2 or 3 comprising:

providing two sheet metal pieces to constitute respective ones of said grate components;

pressing recesses and stop humps into said outer grate component piece, and forming said lateral bars and supporting bars in said inner grate component piece, in such a manner that said supporting bars of said inner grate component have side walls extending transversely to said main surface portion;

forming the inlet surfaces of said slits, partly forming said longitudinal edge parts of said outer component so that the partly formed parts extend transversely to said main surface portion, and forming said longitudinal bars of said inner component to extend transversely to said main surface portion;

inserting said inner component into said outer component; and finally forming said longitudinal edge parts by bending the extremity of each said edge part toward the other said edge part for engaging said inner component longitudinal bars.

*6. In a ladder-like grate for use in drainage ducts comprising an outer component formed from thin sheet like material comprising a main surface portion and opposed, upright longitudinal edges extending along respective longitudinal sides of the main surface portion, each edge including a part which is angled toward the other longitudinal edge, said main surface being formed to define a plurality of spaced inlet slits each extending between said longitudinal edges and defined by folded-down edges and a plurality of transversely extending supporting bars extending between said longitudinal edges in the area between said inlet slits, said supporting bars being in engagement with at least a portion of the main surface extending between said inlet slits and supported by said outer components.*

*7. In a ladder-like grate as set forth in claim 6 wherein the supporting bars are engaged by the folded-down edges.*

*8. In a ladder-like grate as set forth in claim 6 wherein the supporting bars are formed from sheet metal and the outer component is formed from sheet metal.*

*9. In a ladder-like grate as set forth in claim 8 wherein the supporting bars are engaged by the folded-down edges.*

*10. In a ladder-like grate as set forth in claim 9 wherein the supporting bars have a U-shaped cross-section.*

*11. In a ladder-like grate as set forth in claim 6 wherein there are a lesser number of supporting bars than inlet slits.*

* * * * *